(12) United States Patent
Giasson (10) Patent No.: US 9,669,337 B2
(45) Date of Patent: Jun. 6, 2017

(54) METHOD OF CONSTRUCTING A ROTARY DRUM FILTERING APPARATUS

(71) Applicant: GL&V Luxembourg S.à.r.l., Munsbach (LU)

(72) Inventor: Eric Giasson, Trois-Rivieres (CA)

(73) Assignee: GL&V Luxembourg Sàrl, Munsbach (LU)

( * ) Notice: Subject to any disclaimer, the term of this patent is extended or adjusted under 35 U.S.C. 154(b) by 342 days.

(21) Appl. No.: 14/645,077

(22) Filed: Mar. 11, 2015

(65) Prior Publication Data

US 2016/0263501 A1   Sep. 15, 2016

(51) Int. Cl.
*B01D 33/067* (2006.01)
*B01D 33/073* (2006.01)

(52) U.S. Cl.
CPC ......... *B01D 33/073* (2013.01); *B01D 33/067* (2013.01)

(58) Field of Classification Search
CPC ......... Y10T 29/49604; Y10T 29/49892; Y10T 29/49936; Y10T 29/49945; Y10T 29/49947; Y10T 29/49966; Y10T 29/49968; Y10T 403/7005; Y10T 403/7015; B01D 33/06; B01D 33/067; B01D 33/073

USPC ....... 210/399, 400, 401, 402, 403, 404, 405, 210/406, 407; 29/525.01
See application file for complete search history.

(56) References Cited

U.S. PATENT DOCUMENTS

| 4,906,364 | A | * | 3/1990 | Luthi | B01D 33/09 |
| | | | | | 209/407 |
| 2005/0236339 | A1 | * | 10/2005 | Grace | B01D 33/067 |
| | | | | | 210/784 |
| 2007/0012613 | A1 | * | 1/2007 | Grace | B01D 33/067 |
| | | | | | 210/404 |

FOREIGN PATENT DOCUMENTS

CA        2135728 A1 *   5/1995

\* cited by examiner

*Primary Examiner* — Jason L Vaughan
*Assistant Examiner* — Amanda Meneghini
(74) *Attorney, Agent, or Firm* — James Earl Lowe, Jr.

(57) ABSTRACT

A method of constructing a rotary drum filtering apparatus, the method comprising the steps of: placing a cover element end on a support portion, placing an overlying portion over the cover element end and inserting a respective tab into a respective opening in the support portion, moving the overlying portion along the support portion, so that the tab second portion is then under the support portion, thus holding the cap on the clip, with the cover element end trapped in between.

16 Claims, 7 Drawing Sheets

METHOD OF CONSTRUCTING A ROTARY DRUM FILTERING APPARATUS

BACKGROUND

The present invention relates to rotary drum filtering apparatus and more particularly to the drum structure of rotary drum filtering apparatus such as, for example, rotary drum filters, thickeners, washers and the like of the type employed for filtering a slurry such as pulp stock.

Figure 1:
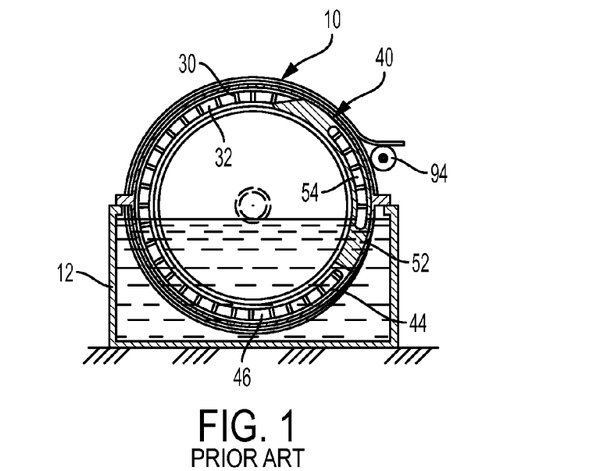
FIG. 1 is an elevation sectional view of a conventional rotary drum filtering apparatus.
Figure 2:
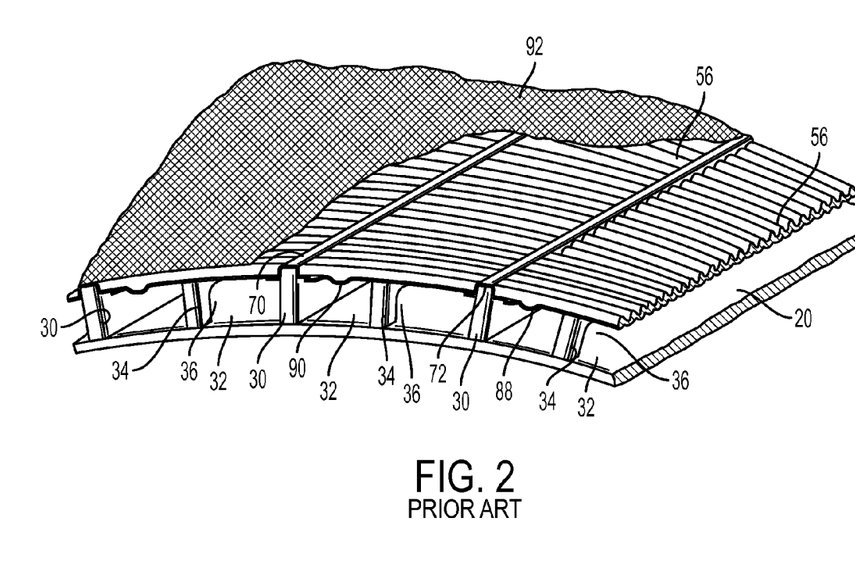
FIG. 2 is an enlarged, fragmentary perspective view showing a portion of the drum structure of the rotary drum filtering apparatus of FIG. 1.

Conventionally, rotary drum filtering apparatus of this general type have included a drum structure that supports a circumferential filter medium and contains filtrate compartments communicating with the openings in the filter medium for receiving liquid drained through the latter. For example, as illustrated in FIGS. 1 and 2, taken form Luthi U.S. Pat. No. 3,837,499, a conventional rotary drum filtering apparatus comprises a drum structure, designated generally as 10, partially submerged in a vat or tank 12 which contains a pulp stock or other slurry to be filtered. The drum structure 10 comprises a generally, rotatably driven drum.

The drum structure includes a supporting drum carrying rib elements defining filtrate compartments that extend generally longitudinally along the drum circumference, and corrugated cover elements mounted to the rib elements by clips to form a cover circumferentially around the supporting drum over the filtrate compartments. Each groove of the corrugations in the outer surface of each cover element communicates with a there below filtrate compartment through a louvered opening arranged to discharge liquid in a direction generally towards the discharge end of the communicating filtrate compartment; and one side of each corrugated element is spaced from the there adjacent portions of the drum structure to permit circumferential expansion of the cover elements.

The opposite ends of the drum structure are closed by end closure plates which are connected to trunnions or similar means for rotatably mounting the drum structure on bearing pedestals. One of the trunnions is hollow and communicates with the upper end of a vacuum pipe or barometric leg which, during the operation of the filtering apparatus, serves in the conventional manner to drain filtrate and create and apply a sub-atmospheric pressure or vacuum.

The plurality of imperforate upstanding rib or division elements 30 are rigidly mounted on an outer circumference 20 of the drum circumferentially spaced around the drum to cause circumferentially adjacent ones of the elements 30 of each drum to form opposing side walls of circumferential filtrate compartments 32. The rib elements 30 extend generally longitudinally along the outer drum circumferences 20 substantially throughout the length of their respective drum; thus, the filtrate compartments 32 of each drum extend generally longitudinally along the outer circumference 20 of the latter substantially throughout its extent. The filtrate compartments 32 of each drum have one or more juxtaposed open discharge ends provided with drainage openings communicating with an annular space at the end of the drum.

As illustrated, a single supporting rib element 34 is affixed to each outer circumference 20 intermediate each two or more circumferentially adjacent rib elements 30, the supporting rib elements 34 extending generally longitudinally along the outer circumferences 20 and having openings 36 there through communicating the portions of the filtrate compartments 32 on opposite sides thereof. Alternatively, however, more than one supporting rib element 34 could be provided between each two of the circumferentially adjacent ones of the rib elements 30.

A stationary or non-rotatable valving assembly, designated generally as 40, is mounted in the space at the end of the drum. The valving assembly 40 is closed at its opposite ends by transversely extending end closure walls (not shown) and along its opposite sides has side walls 52, one of which is shown in FIG. 2. The sidewalls 52 are each provided with an elongated opening 54 there through; and openings in the drum (not shown) permit air from the initially submerging filtrate compartments 32 to escape to the atmosphere through the elongated openings 54. There are numerous equivalent alternate designs for providing the valve function which are not described here.

The drum structure 10 also includes a corrugated cover mounted circumferentially over the filtrate compartments 32 of each drum. The corrugated cover of the drum is formed by a plurality of separate corrugated cover elements or plates 56, each longitudinally the length of one of the filtrate compartments 32 and transversely or circumferentially a width slightly less than one of the filtrate compartments 32, which are mounted along opposite side edges to circumferentially adjacent ones of the rib elements 30. The corrugated cover plates each include an inner face or surface bounding the circumferentially outer side of a respective filtrate compartment 32 and an outer face or surface facing away from such filtrate compartment 32; and the circumferentially adjacent ones of the cover elements 56 of each drum are circumferentially spaced one from the other by the rib element 30. The inner face of each cover element 56 is supported on, but preferably not rigidly affixed to, the intermediate rib 34 in the overload filtrate compartment.

The corrugations of the cover elements 56 extend circumferentially of the drum to provide the inner face of each cover element 56 with substantially parallel, alternate, transverse ridges and grooves while providing the outer face of each cover element 56 with similar generally parallel, alternate, transverse ridges and grooves. The grooves and ridges extend the full width of the cover elements 56. Corrugations easily accommodate thermal expansion, which is a feature inherent in their design. The formation of the corrugations transversely of the cover elements 56 provides the cover elements 56 with substantial inherent flexibility because of thermal changes in the longitudinal direction of the drum.

As illustrated in FIG. 2, the cover elements 56 are supported in their positions overlaying the filtrate compartments 32 on the rib elements 30 by a mounting means comprising a generally "U" shaped mounting clip 70 on each of the rib elements 30. The mounting clips 70, inverted to snuggly receive the upper sides of the rib elements 30 in their recesses 72, extend throughout the lengths of the rib elements 30 and throughout their lengths have integral supporting portions extending outwardly from the opposite side walls bounding the recesses 72. The mounting clips 70 of the drum structure 10 are individual elements formed separately of the cover elements 56.

One edge of each cover element 56 is welded or otherwise rigidly affixed to the side wall and supporting portion of the there adjacent mounting clip in abutting relationship with the side wall to prevent liquid flow between the edge and the there adjacent element 30. The opposite edge of each cover element 56 is illustrated as supported by the supporting portion of the there adjacent mounting clip 70 in interlocking relationship with the latter. The opposite edge of the cover element 56 is throughout its length spaced from the side wall (and hence from the there adjacent rib element 30) by a gap or clearance, thereby permitting lateral expansion of the cover element 56.

It will be understood that the illustrated interlocking arrangement of the edges and mounting clips 70 has been shown for the purposes of illustration only; and the edges alternatively may be otherwise suitably secured in a manner permitting lateral expansion of the cover elements 56, such as for example by the employment of capping elements overlying the ends and the clips 70. In the embodiment illustrated in FIGS. 1 and 2, wherein the drum structure 10 is intended to be rotatably driven in the clockwise direction (as viewed in FIG. 1), the welded edges of the cover element 56 affixed to the side walls and supporting portions are the leading edges of the cover element 56 in the direction of the drum driven rotation; and the other edges are the trailing edges of the cover element 56.

Each groove in each cover element 56 is provided with a louvered opening 88 communicating the groove with the there below filtrate compartment 32 for draining liquid from the former to the latter. The louvered openings 88, as best shown in FIG. 2, are adjacent the bottoms of the grooves; and the louvers 90 for the openings 88 are arranged to direct the liquid flowing from the grooves through the openings 88 to the filtrate compartments 32 in a direction towards the ends of the filtrate compartments 32 having the openings. Although only a single louvered opening 88 located adjacent the edge of the cover element 56 is shown in communication with each groove in the illustrated embodiment, it will be understood that, if desired or required, additional louvered openings 88 could be provided for each of the grooves 68.

The usual wire filter medium 92 is affixed around each drum and supported on the peaks of the ridges of the outer surface of the cover elements 56 and the mounting clips 70.

In the operation of the filtering apparatus, the drum structure 10 is rotatably driven in the clockwise direction (as viewed in FIG. 1) to successively drive the filtrate compartments 32 below the level of the slurry in the vat 12 for solid material accretion on the filter medium 92 and then above such level for drying of accumulated solid material and removal of such material by doctor means (not shown) generally at the location of the roller 94. During the initial submergence of the filtrate compartments 32 into the slurry, solid material accretion is effected without the assistance of the sub-atmospheric pressure, but air in the initially submerging filtrate compartments 32 is allowed to escape to the atmosphere. Below the lower most ends of the walls 52, sub-atmospheric pressure is applied to the filtrate compartments 32 through their open ends and additional solid material is resultantly collected on the filter medium 92. The sub-atmospheric pressure continues to be applied to the compartments 32 as the latter are rotated above the level of the slurry and the accumulated solid material is being dried. The sub-atmospheric pressure is cut-off from the filtrate compartments 32 as they are rotated to the upper end of the walls where the dried collected solid material is removed from the filter medium 92 preparatory to the commencement of another filter cycle.

The liquid drained through the openings in the filter medium 92 passes into the grooves in outer surfaces of the cover elements 56 and flows in such grooves circumferentially of the drum structure 10 to the louvered openings 88 which discharge the liquid to the there below filtrate compartments 32 in a direction generally towards the openings at the discharge ends of the filtrate compartments 32.

Expansion of the cover elements 56 in the longitudinal direction of the drum structure 10 is, of course, accommodated due to the inherent flexibility of the cover elements 56 in the longitudinal direction of the drum. Expansion of the cover elements 56 in the circumferential direction of the drum is permitted due to the gaps and the ability of the cover elements 56 to laterally move or expand relative to the rib elements 34. In the event that one or more of the cover elements 56 requires replacement due to localized damage, corrosion or other reasons, either at the time of assembly, or later in the field, replacement of such cover elements 56 is possible without removal or replacement of the other cover elements 56. But with the cover element 56 edges welded to the mounting clip 70, the removal of the cover element 56 from the drum structure 10 can be difficult.

SUMMARY

The above cover or deck securing method for the conventional washer drum uses cap strips that are T.I.G. welded on the clip or top hat structure. This is a labor-intensive technique that can only be done by a specialized/qualified welder. There is another securing method called the snap in deck, which uses cut outs in the clip or top hat and special tabs welded on the cover elements to enable assembly of the deck without welding of a securing cap strip. This method requires precise manufacturing of the cover elements (with the tabs) and makes assembly of long deck sections very difficult. Shop/field modifications are often required to "adapt" the snap in cover elements to make it fit the top hat cut outs.

The snap in cap strip idea of this disclosure uses a cap or strip as the securing method, without necessarily having to weld the strip in place. Instead of welding, the cap strip is designed to "clip into" or "snap into" cut outs in the top hat clip. This eliminates the usual welding of the cap strip, as well as making the deck cover elements easily removable.

More particularly, disclosed is a method of constructing a rotary drum filtering apparatus, the method comprising the steps of: placing a cover element end on a support portion, placing an overlying portion over the cover element end and inserting a respective tab into a respective opening in the support portion, moving the overlying portion along the support portion, so that the tab second portion is then under the support portion, thus holding the cap on the clip, with the cover element end trapped in between.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF THE EMBODIMENT

Illustrated in FIGS. 3 to 8 is a rotary drum filtering apparatus 100 (see FIG. 3) including a drum structure 110 that supports a circumferential filter medium 192, the drum structure 110 having filtrate compartments 132 communicating with openings in the filter medium 192 for receiving liquid drained through the latter. Like elements to those of FIGS. 1 and 2 have similar numbering, only with 100 added to the number shown in FIGS. 1 and 2.

Figure 3:
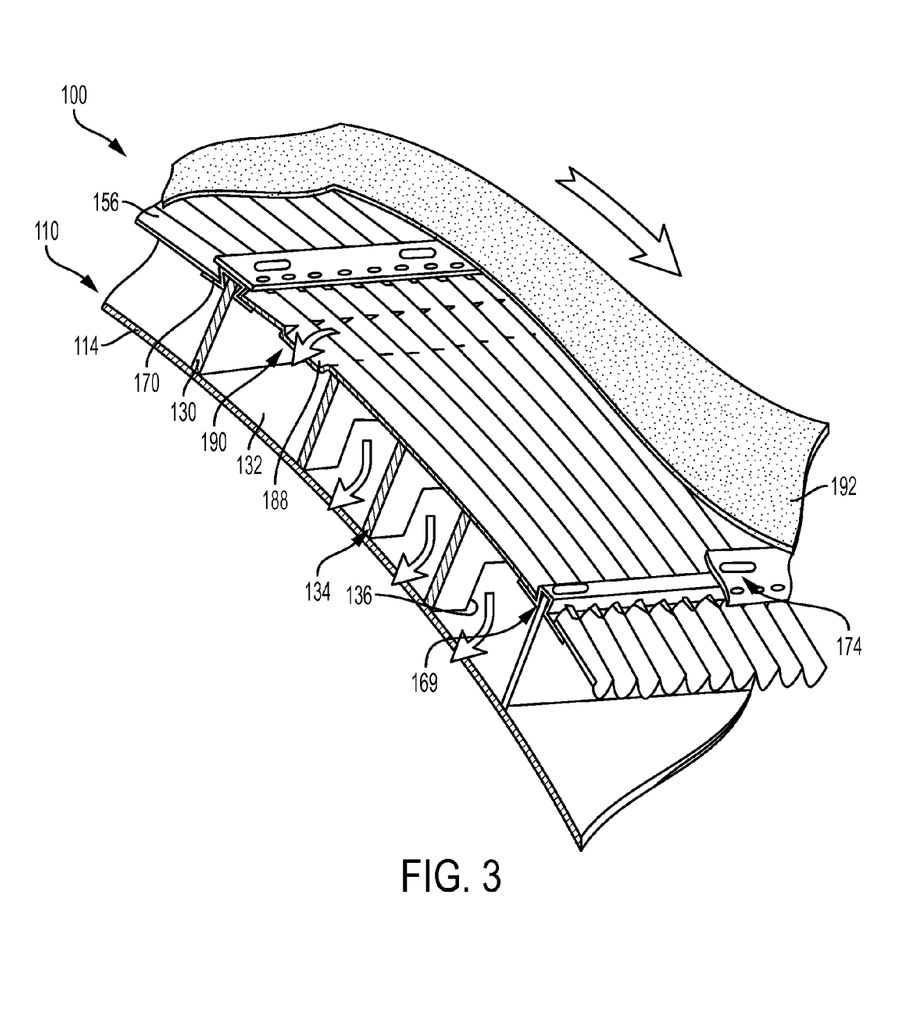
FIG. 3 is an enlarged, fragmentary perspective view showing a portion of a drum structure of a rotary drum filtering apparatus according to this disclosure.

The drum structure 110 includes a supporting drum 114, radially extending rib elements 130 supported on the drum 114 and defining filtrate compartments 132 which extend generally longitudinally along the drum circumference, and corrugated cover elements 156, each having an end mounted to the rib elements by a mounting means comprising a mounting clip 170 and an overlying cap 174. The cover elements 156 thus form a cover circumferentially around the supporting drum over the filtrate compartments.

Between each of the radially extending rib elements 130 are one or more support elements 134, as needed, to provide additional support to the underside of the cover elements 156. A seal 169 is placed between the leading edge of each cover segment 156 and its respective clip 170, as shown in FIG. 4, extending the length of the clip 170.

Figure 4:
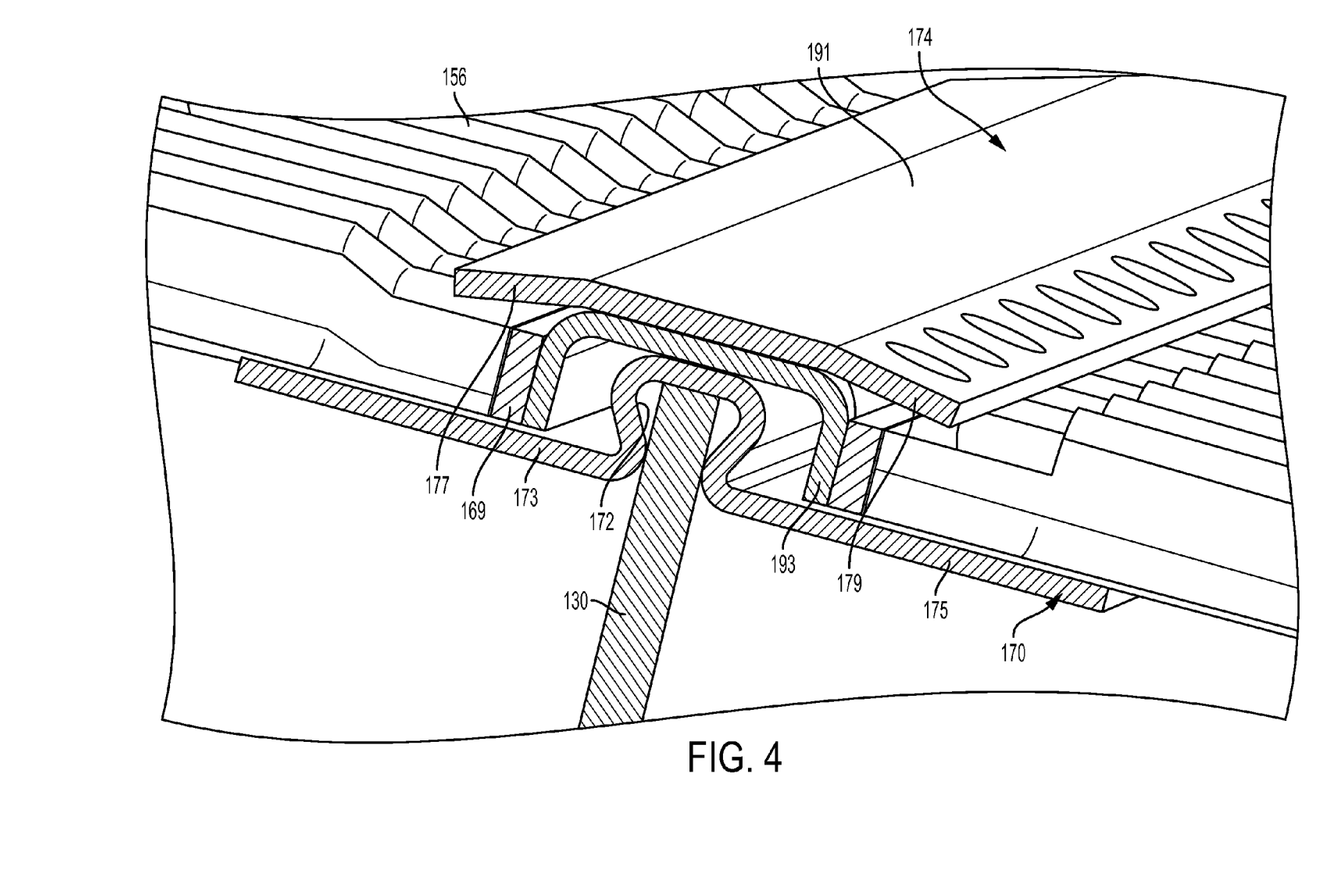
FIG. 4 is an enlarged, fragmentary top perspective view showing a portion of the means for securing the corrugated cover elements in the rotary drum filtering apparatus of FIG. 3.
Figure 5:
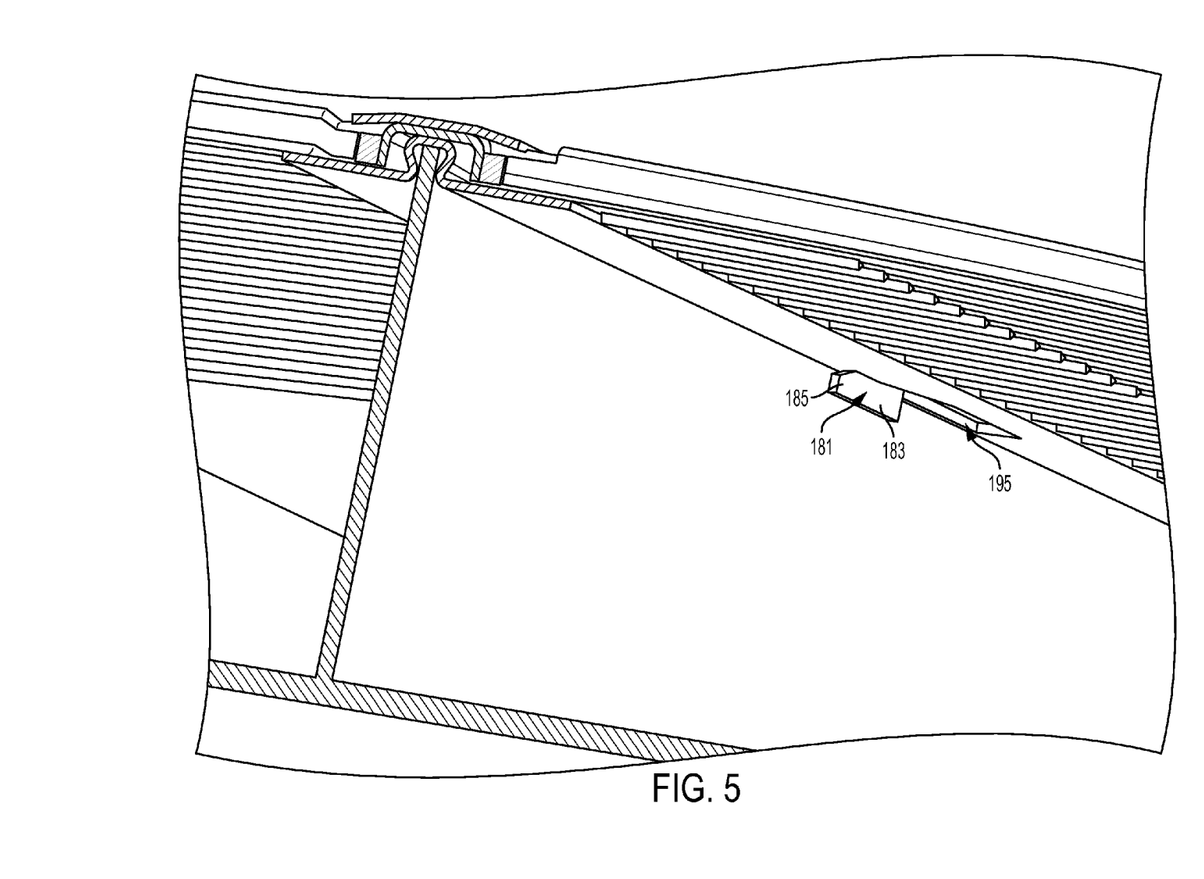
FIG. 5 is an enlarged, fragmentary bottom perspective view showing a portion of the means for securing the corrugated cover elements in the rotary drum filtering apparatus of FIG. 3.

Each clip 170 is hat shaped and has first and second coplanar cover element edge support portions, 173 and 175, respectively (see FIGS. 4 and 5). The mounting clips 170, inverted to snuggly receive the upper sides of the rib elements 130 in their recesses 172, extend throughout the lengths of the rib elements 130 and throughout their lengths have the integral supporting portions extending outwardly from the opposite side walls bounding the recesses 172. The mounting clips 170 of the drum structure 110 are individual elements formed separately of the cover elements 156. Each clip is attached at spaced apart locations to its respective rib element by welding, gluing or other appropriate method.

Figure 6A:
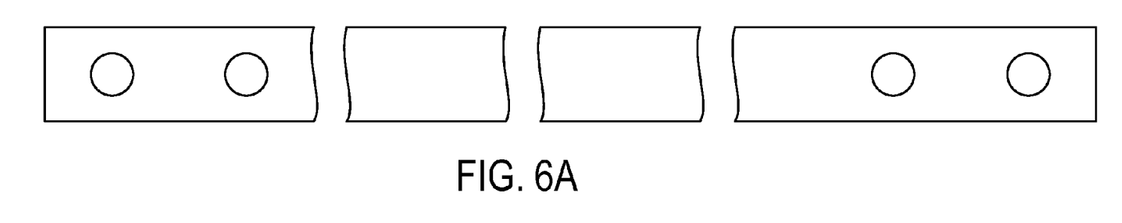
FIGS. 6A, 6B, and 6C show a second piece of the means for securing the section elements to a clip. 6A is a top view, 6B is a side view, and 6C is an end view.
Figure 6B:
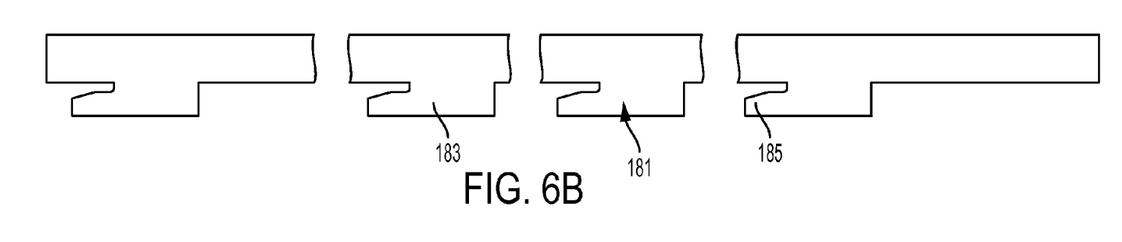
Figure 6C:
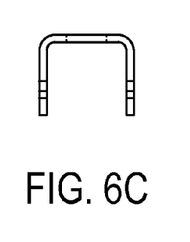
Figure 7A:
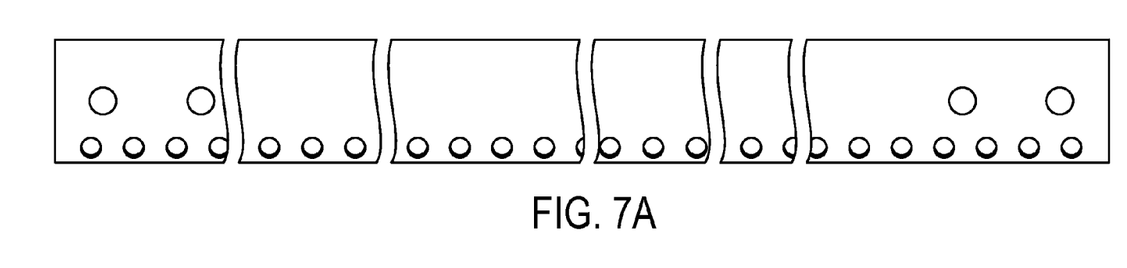
FIGS. 7A, 7B, and 7C show a first piece and a second piece of the means for securing the section elements to the clip. 7A is a top view, 7B is a side view, and 7C is is an end view.
Figure 7B:
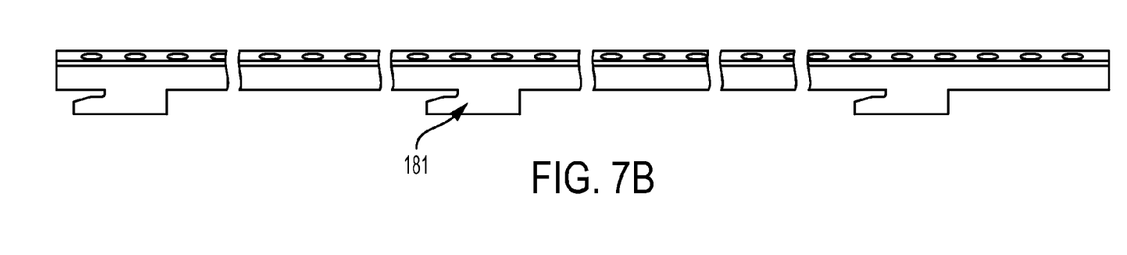
Figure 7C:
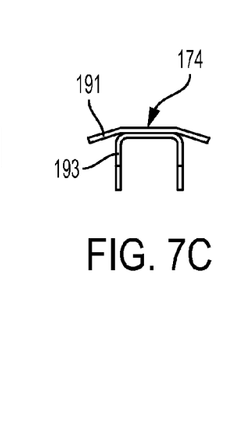

As shown in FIG. 4, each cap 174 has opposite extending first and second cover element edge-overlying portions, 177 and 179, respectively, each overlying portion including a plurality of tabs 181 spaced apart along the longitudinal axis of the overlying portion, as shown in FIGS. 5, 6 and 7. More particularly, the cap 174, as shown in FIG. 7, is formed from a first piece 191 with the overlying portions that are over and hold its respective cover element end, as shown in FIG. 7C.

The cap 174 is also formed from a second U-shaped piece 193, as shown in FIGS. 6 and 7, with the plurality of spaced apart tabs 181 depending from the side walls of the U-shaped piece, the second piece 193 being secured, such as by welding, gluing or other appropriate means, to the first piece 191. In other less preferred embodiments, the cap can be formed from a single piece (not shown).

As shown in FIG. 5, each cap tab 181 has a first portion 183 that, when the drum is assembled, extends perpendicular to the respective support portion, and a second portion 185 angled relative to the first tab portion 183 and extending parallel to the longitudinal axis of the cap 174.

In the illustrated embodiment, the tabs in the assembled drum are located between the ends of the cover elements and the clip. In other less preferred embodiments (not shown), the tabs can pass through openings through the cover elements ends, although this would add the extra step of putting openings in the cover elements for the tabs. It would however add further means for securing the cover elements on the clip.

Figure 8A:
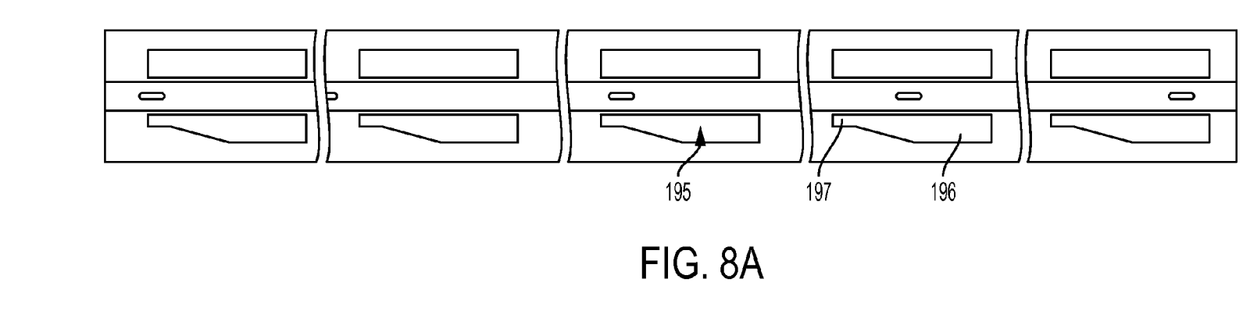
FIGS. 8A, and 8B show the clip or top hat structure. 8A is a top view, and 8B is is an end view.
Figure 8B:
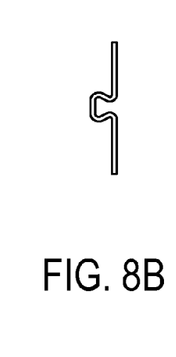

The support portion has a plurality of tab receiving openings 195 (see FIGS. 5 and 8A) spaced apart along the longitudinal axis of the support portions, the openings 195 corresponding to the locations of the tabs 181. The clip tab receiving openings 195 have a wide width 196 for initially receiving the tabs 181, a narrow width 197 for holding the tabs 181, and a transition between the wide width and the narrow width. The tab receiving openings narrowing in the tab moving direction help to secure the tabs in a particular position, while the wide width reduces the difficulty of placing the tabs in the openings. As illustrated in FIG. 8A, this is done on only one side of the clip, although in other embodiments (not shown), it could be done on both sides.

The drum structure is assembled by placing the cover element end on the clip support portion, placing the cap overlying portion over the cover element end, and inserting each respective tab into a respective opening in the support portion. Then an assembler moves the overlying portion along the clip support portion, so that the tab second portion engages the support portion, pulling the tab first portion through the tab-receiving opening, so that the overlying portion is pulled tighter against the cover element ends. The tab second portion is then under the support portion, thus holding the cap on the clip, with the cover element ends trapped in between.

More particularly, the adjacent ends of two cover elements are placed on the clip, the clip having two coplanar support portions extending in opposite directions, each support portion supporting a respective one of the adjacent cover element ends. And the cap has two coplanar overlying portions, each of which is placed over a respective cover element end. As shown in FIGS. 4 and 5, each of the overlying portions 177 and 179 extend at an angle towards the cover element end relative to the support portions that holds the cover element ends. Thus, both ends of two adjacent cover elements are locked in place with the assembly of one cap.

After placing one cap on the clip, another cap is placed adjacent the first cap, and so on, until the full drum is assembled. To complete the assembly, the caps are then locked in place, such as by welding, gluing or any other appropriate means.

The drum so assembled then has a number of advantages over the conventional drum construction. It is no longer necessary to have the cover element ends welded to a clip-supporting portion. This reduces the cost of the cover elements, for in the conventional approach, the cover element supplier welded the cover elements and clips. Further, since the cover elements no longer need to come welded to the clips, it is easier for the assemblers to access inside the cover elements during the assembly process.

In addition, in conventional drums, the caps needed to be welded to the clips by skilled assemblers. Now, in the drum according to this disclosure, since the assembler only needs to place the cap tabs inside the tab openings, and then slide the cap along the clip, the assembly process is much simpler.

It is now also more convenient, in the drum according to this disclosure, for cover elements to be replaced in the field. It is no longer necessary to separate welded cover elements from the clips, for now the cap just needs to be released from its respective clip, slid along the clip so that the tabs can be removed from the tab openings, and then pulled away from the rib elements. This makes the removal of cover elements a much easier process.

Various other features of this disclosure are set forth in the following claims.

The invention claimed is:

1. A method of constructing a rotary drum filtering apparatus including: a drum structure that supports a circumferential filter medium, the drum structure having filtrate compartments communicating with openings in the filter medium for receiving liquid drained through the latter, the drum structure including a supporting drum, rib elements supported on the drum and defining the filtrate compartments which extend generally longitudinally along the drum circumference, and cover elements, each having an end mounted to the rib elements by a clip and an overlying cap, the cover elements forming a cover circumferentially around the supporting drum over the filtrate compartments, each clip having a cover element edge support portion, and each cap having a cover element edge overlying portion, the overlying portion including a plurality of tabs spaced apart along the longitudinal axis of the overlying portion, each tab having a first portion that, when the drum is assembled, extends perpendicular to the support portion, and a second portion angled relative to the first portion and extending parallel to the longitudinal axis of the cap, the support portion having tab receiving openings spaced apart along the longitudinal axis of the support portions, the method comprising the steps of:
placing the cover element end on the support portion,
placing an overlying portion over the cover element end and inserting each respective tab into a respective opening in the support portion,
moving the overlying portion along the support portion, so that the tab second portion is then under the support portion, thus holding the cap on the clip, with the cover element end trapped in between.

2. The method according to claim 1, wherein, when pulling the tab first portion through the tab-receiving opening, the tab second portion engages the support portion so that the overlying portion is pulled tighter against the cover element ends.

3. The method according to claim 1, wherein the overlying portion extends at an angle relative to the support portion towards the cover element that holds the cover element end.

4. The method according to claim 1, wherein the clip is hat shaped, and is placed over an end of a rib element.

5. The method according to claim 1, wherein several adjacent caps are placed on and moved along the rib element.

6. The method according to claim 1, wherein the clip is spot-welded to the rib element.

7. The method according to claim 1, wherein the adjacent ends of two cover elements are placed on the clip, the clip having two coplanar support portions, each support portion supporting a respective one of the adjacent cover element ends, and wherein the cap has two overlying portions, each of which is placed over a respective cover element end.

8. The method according to claim 1, wherein the cap is formed from a first piece with the overlying portion that is over and holds the cover element end, and from a second piece with the plurality of spaced apart tabs, the second piece being secured to the first piece.

9. The method according to claim 1, wherein the clip tab-receiving openings have a wide width for initially receiving the tabs, a narrow width for holding the tabs, and a transition between the wide width and the narrow width.

10. The method according to claim 1, wherein, when pulling the tab first portion through the tab-receiving opening, the tab second portion engages the support portion so that the overlying portion is pulled tighter against the cover element ends, and wherein the clip is hat shaped, and is placed over an end of a rib element.

11. The method according to claim 10, wherein the overlying portion extends at an angle relative to the support portion towards the cover element that holds the cover element end.

12. The method according to claim 11, wherein several adjacent caps are placed on and moved along the rib element.

13. The method according to claim 12, wherein the clip is spot-welded to the rib element.

14. The method according to claim 13, wherein the adjacent ends of two cover elements are placed on the clip, the clip having two coplanar support portions, each support portion supporting a respective one of the adjacent cover element ends, and wherein the cap has two overlying portions, each of which is placed over a respective cover element end.

15. The method according to claim 14, wherein the cap is formed from a first piece with the overlying portion that is over and holds the cover element end, and from a second piece with the plurality of spaced apart tabs, the second piece being secured to the first piece.

16. The method according to claim 15, wherein the clip tab-receiving openings have a wide width for initially receiving the tabs, a narrow width for holding the tabs, and a transition between the wide width and the narrow width.

* * * * *